Patented June 5, 1928.

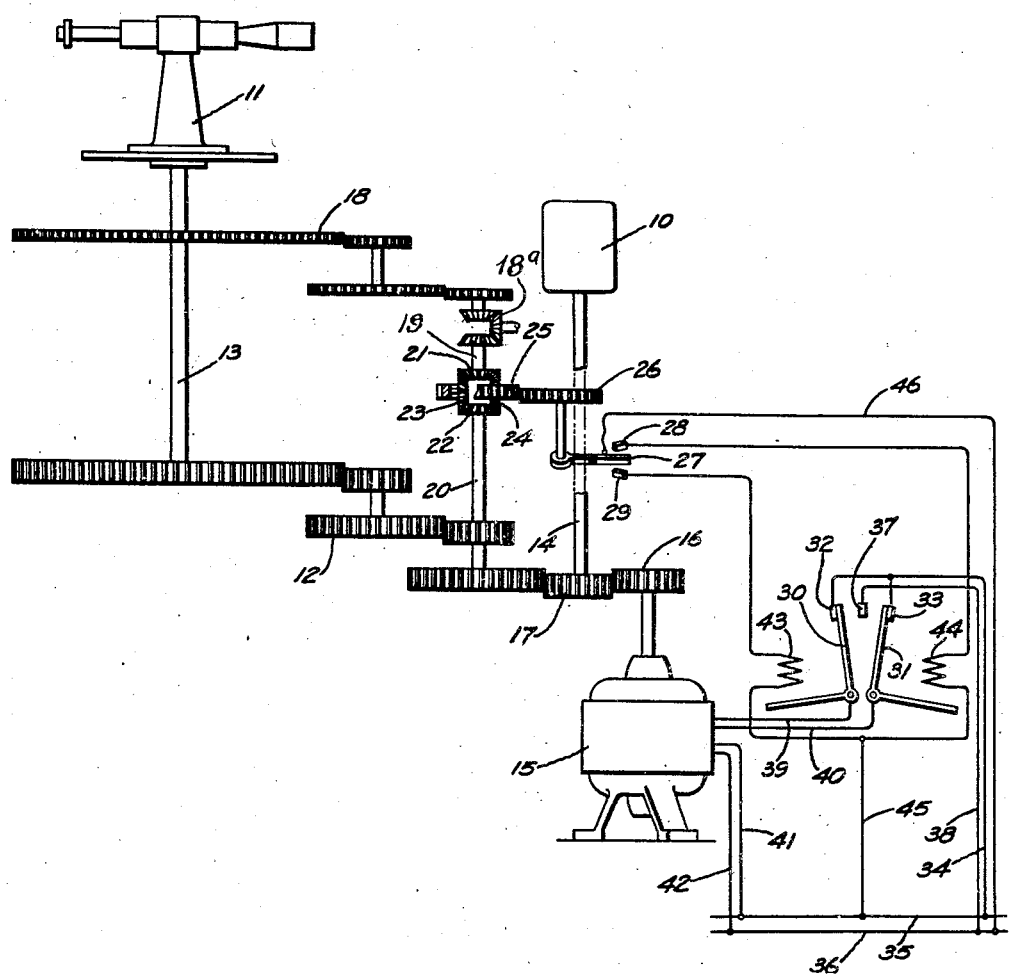

1,672,677

UNITED STATES PATENT OFFICE.

ALVARADO L. R. ELLIS, OF SWAMPSCOTT, MASSACHUSETTS, ASSIGNOR TO GENERAL ELECTRIC COMPANY, A CORPORATION OF NEW YORK.

DRIVING MECHANISM.

Application filed July 14, 1925. Serial No. 43,626.

My invention relates to driving mechanism and has for its object the provision of means for driving an object with great accuracy from another object.

More specifically my invention has for its object a driving connection wherein errors due to flexure of the various parts of the driving mechanism are avoided. Any force applied to a mechanical part, such as a shaft, gear, lever, etc., produces a flexure in that part which of course, varies with the magnitude of the applied force. Where great accuracy is demanded this becomes an important consideration for the error due to flexure alone, in addition to inaccuracies in construction, may well exceed the maximum allowable error in the driving connection.

My invention has particular application where a speed ratio is introduced by the driving connection, and it is necessary to apply the driving force to the low speed end of the driving connection, such for example as in the driving of an indicator or motion transmitting device at many times the speed of a driving object, such as a telescope. In this case it is obvious that a relatively large driving force must be applied not only in order to drive the object, but also to overcome the inertia in starting of the object and various parts of the driving connection itself.

In carrying out my invention, I provide a driving motor for the driven object, which motor is controlled in response to the flexure of the driving connection in such manner that the driving connection is relieved of a large part of the required driving force and its flexure thereby reduced.

For a more complete understanding of my invention reference should be had to the accompanying drawing, the single figure of which is a diagrammatic view showing driving mechanism embodying my invention.

Referring to the drawing, I have shown my invention in one form as applied to the driving of an angular motion transmitting device 10 of any suitable form, constituting a high speed driven object, at a high speed ratio with respect to a telescope or sighting device 11, constituting a low speed driving object. As shown the transmitting device is connected by a driving gear train 12 to the telescope so as to be actuated in a predetermined high speed ratio with the movements of the telescope about a normally vertical axis. This axis may be defined by a driving shaft 13 secured to the telescope to which the shaft 14 of the transmitting device is connected by the gear train 12. The driving ratio of the gear train 12 may, for example, be 72:1.

It will be seen that the force which must be applied to the telescope 11 in order to turn the shaft 14 of the transmitting device is multiplied in proportion to the driving ratio, and in addition there must be added the friction and the inertia of the various parts. This driving force causes flexure of various parts, particularly those low speed parts closely associated with the telescope. Due to this flexure it may be possible to turn the telescope through an appreciable angle before rotation of the shaft 14 of the transmitting device is produced. Where great accuracy is an important consideration it is evident that such an arrangement would be impracticable.

In accordance with my invention I provide a suitable driving motor 15, shown as a shunt wound electric motor, which is connected directly to the shaft 14 of the transmitting device by means of a gear 16 on the shaft of the motor which meshes with the gear 17 on the shaft 14. This motor drives the transmitting device, and it is controlled automatically by virtue of the flexure of the various parts of the driving connection between the telescope and the transmitting device of which the gear train 12 forms a part. A gear train 18 of relatively light construction is driven by the telescope 11. The driving ratio of this gear train is the same as the driving ratio of the gear train 12, or the same as the driving ratio of a certain portion of the gear train 12. The shaft 19 is driven by the gear train 18 through reversing gears 18ª at the same speed as the shaft 20 is driven by the gear train 12, the shaft 20 being connected to the gear train 12 at the high speed end of this gear train or near that end. The shafts 19 and 20 are connected to bevelled gears 21 and 22 respectively forming part of a conventional type of differential gearing. As shown, the gears 21 and 22 cooperate with similar bevelled gears 23 and 24 which are carried by a ring gear 25. This ring gear 25 drives the gear 26 to which is secured a contact arm 27 moving between two stationary contacts 28 and 29 whereby the circuit of the motor 15 is controlled.

The contact arm 27 controls two pivoted contact arms 30 and 31 in the armature circuit of the motor. These contact arms are biased by their own weight into engagement with stationary contacts 32 and 33 which are electrically connected together, and also electrically connected through a conductor 34 to a supply main 35 forming one side of a suitable source of electrical supply, the other side of which is formed by a supply main 36. Between the contacts 32 and 33 is a stationary contact 37 which is electrically connected through a conductor 38 to the supply main 36. The contact arms 30 and 31 are connected through conductors 39 and 40 to the armature terminals of the motor. The field of the motor is connected to the mains 35 and 36 by means of the conductors 41 and 42.

The contact arms 30 and 31 are actuated by means of magnet coils 43 and 44. One terminal of each of the coils 43 and 44 is connected through a conductor 45 to the supply main 35. The remaining terminal of the coil 43 is connected to the contact 29, while the remaining terminal of the coil 44 is connected to the contact 28. The contact arm 27 is electrically insulated from its supporting or driving parts and is electrically connected through conductor 46 to the supply main 36.

As thus constructed and arranged the operation of my invention is as follows:—

When a turning force is applied to the telescope 11 a certain amount of flexure will be produced in the driving gear train 12 and other parts associated with it before a sufficient force has been applied to the shaft to operate the transmitting device. This turning of the telescope 11 independently of the transmitting device is transmitted through the light gear train 18 and the differential device to the contact arm 27, since this driving connection has but a very small force to transmit in moving the contact arm 27 and furthermore since the various parts are of very light construction and have but little inertia. The control means for the motor is so arranged that the independent movement of the telescope produced by the application of a force which is only a very small part of that which would be required to drive the transmitting device is sufficient to move the contact arm 27 into engagement with one or other of the contacts 28 and 29, and thus start the motor. It will be observed that when the contact arm 27 engages the contact 28 the coil 44 is energized whereby the contact arm 31 is moved into engagement with the central contact 37 and the armature circuit of the motor is energized in the proper direction to cause the motor to drive the transmitting device in the direction of the force being applied to the telescope. When the telescope is turned in the opposite direction the contact arm 27 engages the contact 29 whereby the coil 43 is energized and the contact arm 30 moved into engagement with the central contact 37 to start the motor in the opposite direction.

As long as the driving force is applied to the telescope and the contact 27 thereby maintained in engagement with one or the other of its contacts, the motor 15 will be in operation to drive the transmitting device. As soon as this driving force is removed, however, the contact arm 27 breaks the control circuit and the contact arm 30 or 31, as the case may be, immediately moves into engagement with the contact 32 or 33 in accordance with its bias. In this position of the contact arms 30 and 31, which is shown in the drawing, the armature of the motor is short circuited and the motor is thereby brought quickly to rest by dynamic braking.

It should be understood that in this specification and the appended claims, I use the terms "low speed" and "high speed" in a relative sense only. The motion of the transmitting device 10 may be quite slow as compared with the motion of other well-known objects ordinarily termed "high speed", but as compared with the telescope, the transmitting device is driven at high speed, and conversely as compared with the transmitting device, the telescope moves at low speed.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:—

1. Means for driving an object from another object comprising a gear train forming a driving connection between said objects, a driving motor operatively connected to said driven object, and means responsive to flexure of said gear train for starting said motor.

2. Means for driving an object at high speed with respect to another object by means of a force applied to the low speed object comprising a gear train forming a driving connection between said objects, a motor for driving said high speed object, control means for said motor, and a driving connection between said control means and said low speed object whereby said motor is started upon flexure of said gear train.

3. Means for driving an object at high speed with respect to another object by means of a force applied to the low speed object comprising a heavy gear train forming a mechanical connection between said objects, a motor for driving said high speed object, a relatively light gear train connected to said low speed object, and control means for said motor actuated by said light gear train to start the motor upon flexure of said heavy gear train.

4. Means for driving one object from another object comprising a mechanical driving connection between said objects, a relatively light driving connection connected to said driving object, and operating means for said driven object controlled jointly by said driving connections in accordance with the relative displacement of said objects due to flexure of said driving connection.

5. Means for driving one object from another object comprising a gear train forming a driving connection between said objects, a relatively light gear train connected to said driving object, and operating means for said driven object controlled jointly by said gear trains in accordance with the relative displacement of said objects due to flexure of said driving connection.

6. Means for driving a motion transmitting device at high speed with respect to a driving object, comprising a gear train forming a mechanical connection between said transmitting device and said driving object, a motor for driving said transmitting device, a relatively light gear train connected to the driving object, and control means for said motor actuated by said gear trains, whereby said motor is started by said light gear train upon independent movement of said driving object due to flexure of said gear train connection.

7. Means for driving an object at high speed from another object, comprising a high speed ratio gear train connecting said objects, an electric driving motor, a driving connection between said motor and said high speed object, control means for said motor, and an operating connection between said control means and said low speed object whereby said motor is started upon flexure of said gear train to drive said high speed object in a direction to follow said low speed object.

In witness whereof, I have hereunto set my hand this 10th day of July, 1925.

ALVARADO L. R. ELLIS.